United States Patent [19]
Ofek

[11] Patent Number: 5,245,605
[45] Date of Patent: Sep. 14, 1993

[54] INTEGRATION OF SYNCHRONOUS AND ASYNCHRONOUS TRAFFIC ON RINGS

[75] Inventor: Yoram Ofek, Riverdale, N.Y.

[73] Assignee: International Business Machines Corporation, Armonk, N.Y.

[21] Appl. No.: 771,692

[22] Filed: Oct. 4, 1991

[51] Int. Cl.$^5$ ............................................. H04J 3/02
[52] U.S. Cl. ................................ 370/85.12; 370/85.5
[58] Field of Search ............... 370/85.12, 85.5, 85.15, 370/91, 94.2, 60, 94.1, 85.4

[56] References Cited

U.S. PATENT DOCUMENTS

| | | | |
|---|---|---|---|
| 4,538,147 | 8/1985 | Grow | 370/85.5 |
| 4,926,418 | 5/1990 | Cidon et al. | 370/85.12 |
| 5,065,397 | 11/1991 | Shiobara | 370/85.5 |

Primary Examiner—Douglas W. Olms
Assistant Examiner—Shick Hom
Attorney, Agent, or Firm—Douglas W. Cameron

[57] ABSTRACT

A method and apparatus for controlling the transmission of a first class of traffic which is transmitted on a ring network with a second class of traffic. This invention provides for the transmission of a first control signal where both classes of traffic may be transmitted on the ring if current protocols permit. This first control signal will be changed to a second control signal if, after the first control signal is transmitted at least once around the network, the first control signal reaches a station having a backlog of second class traffic. The second control signal is transmitted once around the ring network to indicate to each station that it may not transmit the first class traffic. The first class of traffic is usually asynchronous data, while the second class of traffic is usually synchronous data.

20 Claims, 12 Drawing Sheets

| 4B/5B ENCODER SCHEME | | |
|---|---|---|
| HEX DATA | 4-BIT BINARY DATA | 5-BIT ENCODED SYMBOL |
| 0 | 0000 | 11110 |
| 1 | 0001 | 01001 |
| 2 | 0010 | 10100 |
| 3 | 0011 | 10101 |
| 4 | 0100 | 01010 |
| 5 | 0101 | 01011 |
| 6 | 0110 | 01110 |
| 7 | 0111 | 01111 |
| 8 | 1000 | 10010 |
| 9 | 1001 | 10011 |
| A | 1010 | 10110 |
| B | 1011 | 10111 |
| C | 1100 | 11010 |
| D | 1101 | 11011 |
| E | 1110 | 11100 |
| F | 1111 | 11101 |

FIG.6

| AM7968 TRANSMITTER ||| 
| COMMAND INPUT || |
| HEX | BINARY | ENCODED SYMBOL |
|---|---|---|
| 1 | 0001 | 11111 11111 |
| 2 | 0010 | 01101 01101 |
| 3 | 0011 | 01101 11001 |
| 4 | 0100 | 11111 00100 |
| 5 | 0101 | 01101 00111 |
| 6 | 0110 | 11001 00111 |
| 7 | 0111 | 11001 11001 |
| 8 | 1000 | 00100 00100 |
| 9 | 1001 | 00100 11111 |
| A | 1010 | 00100 00000 |
| B | 1011 | 00111 00111 |
| C | 1100 | 00111 11001 |
| D | 1101 | 00000 00100 |
| E | 1110 | 00000 11111 |
| F | 1111 | 00000 00000 |

POSSIBLE SAT CONTROL MESSAGE { (rows 1–F)

FIG. 8

INTEGRATION OF SYNCHRONOUS AND ASYNCHRONOUS TRAFFIC ON RINGS

TECHNICAL FIELD

This invention relates to the transmission of two classes of traffic on a ring network. More specifically, this invention provides for a method and apparatus for controlling the transmission of asynchronous traffic on the network on which both asynchronous and synchronous traffic are transmitted.

DESCRIPTION OF THE PRIOR ART

Many previous attempts to reduce the complexity of local area networks (LAN) focus on simple topological structures in the form of a bus, star or ring. To further simplify the architecture, most current local and metropolitan area networks do not permit concurrent access of the LAN by more than one user or spatial reuse [1-4]. With some of the LAN networks, the above restrictions are due to the passive nature of the transmission media (e.g., Ethernet, passive optical star). Other designs, like the dual token ring networks (FDDI[1,2]) or dual slotted bus (DQDB[3]), have been adopted to achieve simplicity and fairness.

The token ring is a popular LAN structure that is based on passing a token (permit to transmit) between nodes of the ring in a round robin order. The token itself is attached to the head or tail of a transmitted message. The token ring relies heavily on the integrity of the token mechanism, and loss or duplication of the token results in a need for network reinitialization.

A new approach for high speed LAN is the QPSX or DQDB which has a slotted dual bus structure with centralized control [3]. With this bus structure, a fairness and access mechanism is based on having stations request empty slots and counting these requests.

Existing protocols, such as the token ring (IEEE Standard 802.5), Ethernet (IEEE Standard 802.3), FDDI (American National Standard, ASC X3T9.5), DQDB or QPSX (IEEE Standard 802.6), do not provide for spatial bandwidth reuse together with synchronous and asynchronous traffic integration; hence, the capacity of systems using these protocols would be limited by the capacity of a single link.

Buffer insertion access control [5,6,7] provides spatial bandwidth reuse with concurrent access to the ring, and is designed for asynchronous transmission of variable size packets. With buffer insertion, a node can transmit a packet as long as its insertion buffer is empty, i.e., the ring traffic has preemptive priority over node traffic that is to be transmitted on the ring. The buffer insertion scheme, however, can result in starvation since an upstream node can transmit continuously and block a down-stream node. A technique on how to have some measure of fairness in a buffer or register insertion ring is described in an IEEE article [7] by Mission et al. This article describes a synchronous and slotted ring with fairness and control of the ring being accomplished by a monitor station. The solution described therein, however, is centralized as opposed to the integration solution in this invention which is completely distributed.

The MetaRing is a buffer insertion ring with fairness and spatial bandwidth reuse ([8] and U.S. Pat. No. 4,926,418). In that work the fairness is achieved by using a special control signal, called SAT, for regulating the asynchronous access to the ring. The SAT gives each node it traverses a predefined transmission quota. When the SAT comes back to the node, it waits until the node is SATisfied (i.e., that its quota has been transmitted), before forwarding the SAT and renewing the node's transmission quota. While the MetaRing and U.S. Pat. No. 4,926,418 provide for efficient integration of synchronous and asynchronous traffic over a ring with concurrent access and spatial reuse, this invention, however, further regulates asynchronous traffic in the presence of high priority synchronous traffic.

With the TIMED-TOKEN protocol of FDDI [1,2], only subset of the nodes can transmit asynchronously. Thus, asynchronous fairness in FDDI is achieved only after many rounds of the TIMED-TOKEN.

An additional control signal, called SAT, for ensuring fairness of the asynchronous traffic is described in a 1989 IBM Research Report [8].

1. W. E. Burr, "The FDDI Optical Data Link", IEEE Communication Magazine, Vol. 24, No. 5, May, 1986, pp. 18-23.

2. F. E. Ross, "FDDI—A tutorial", IEEE Communication Magazine, Vol. 24, No. 5, May 1986. pp 10-17.

3. J. L. Hullet and P. Evans, "New Proposal Extends the Reach of Metro Area Nets", Data Communications, February 1988, pp. 139-147.

4. A. Hopper and R. M. Needham, "The Cambridge Fast Ring Networking System", IEEE Trans. on Computers, Vol. 37, No. 10, October 1988, pp. 1214-1223.

5. M. T. Liu and D. M. Rouse, "A Study of Ring Networks", Proc. IFIP WG 6.4, pp 1-39.

6. D. E. Huber, W. Steinlin and P. J. Wild, "SILK: An Implementation of a Buffer Insertion Ring", IEEE J. on Selected Areas in Communications, Vol. SAC-1, No. 5, November 1983, pp. 766-744.

7. M. Mission, J-J. Mercier and A. El Oussoul, "A Fair Management of Communication for a Ring LAN", 1988 Local Computer Network Conference, pp. 395-404.

8. I. Cidon and Y. Ofek, "MetaRing—A Full-Duplex Ring with Fairness and Spatial Reuse," IBM Research Report RC 14961, September 1989, also INFOCOM'90.

SUMMARY OF THE INVENTION

It is an object of this invention to provide a dynamic mechanism for the integration of synchronous and asynchronous traffic on a ring network with efficient use of the available bandwidth.

It is more specifically an object of this invention to provide a mechanism for dynamically controlling flow of asynchronous data where there is a backlog of synchronous data to be transmitted on a ring network.

It is also an object of this invention to provide a buffer insertion or slotted ring that will operate with a control signal that can change its state as it travels around the ring.

Accordingly, this invention provides a method and apparatus for controlling the transmission of a first class of traffic that is transmitted with a second class of traffic on a ring network. With this invention a first control signal is transmitted around the ring at least predefined number of times, k, such that $k \geq 0$. More generally, the first control signal is transmitted on the ring until a predefined condition exists. This first control signal indicates to each station on the ring that it may transmit both classes of traffic if current protocols on the ring network permit. After the first control signal has been transmitted around the ring at least k times, the first control signal will be changed to a second control signal if the first control signal reaches a station of the ring having a backlog of the second class of traffic to be transmitted. Then, the second control signal will be transmitted to each station of the ring to indicate to each station that each station may not transmit the first class traffic on the ring.

The first class of traffic is usually asynchronous traffic while the second class of traffic is typically synchronous traffic.

Further and more specifically, the second control signal will be changed to a third control signal after the second control signal has been transmitted around the ring network. The third control signal will be transmitted around the ring, but each station of the ring will hold the third control signal until it transmits all of its backlog of the second class of traffic. After the third control signal has been transmitted around the ring, it will then be changed to the first control signal, and the process will repeat itself. Thus, a more specific implementation is based on a control signal (ASYNC-EN), which circulates around the ring in the direction opposite to that of the traffic it regulates. The ASYNC-EN, which has three different states, is used for enabling or disabling the transmission of asynchronous traffic. The three different states of ASYN-EN control signal can also be treated, as above, as three different control signals.

For the synchronous or real-time traffic a distributed reservation or connection set-up mechanism is used. This real-time traffic is sent into the ring with a higher priority than the asynchronous traffic. As a result, a small delay bound is guaranteed.

BRIEF DESCRIPTION OF THE DRAWINGS

FIG. 6 is a table illustrating a 4B/5B code for implementing the transmission of distinct control signals.

FIG. 8 is a table of possible control words and corresponding encoded symbols for the control signal.

DESCRIPTION OF THE PREFERRED EMBODIMENT

Figure 1:
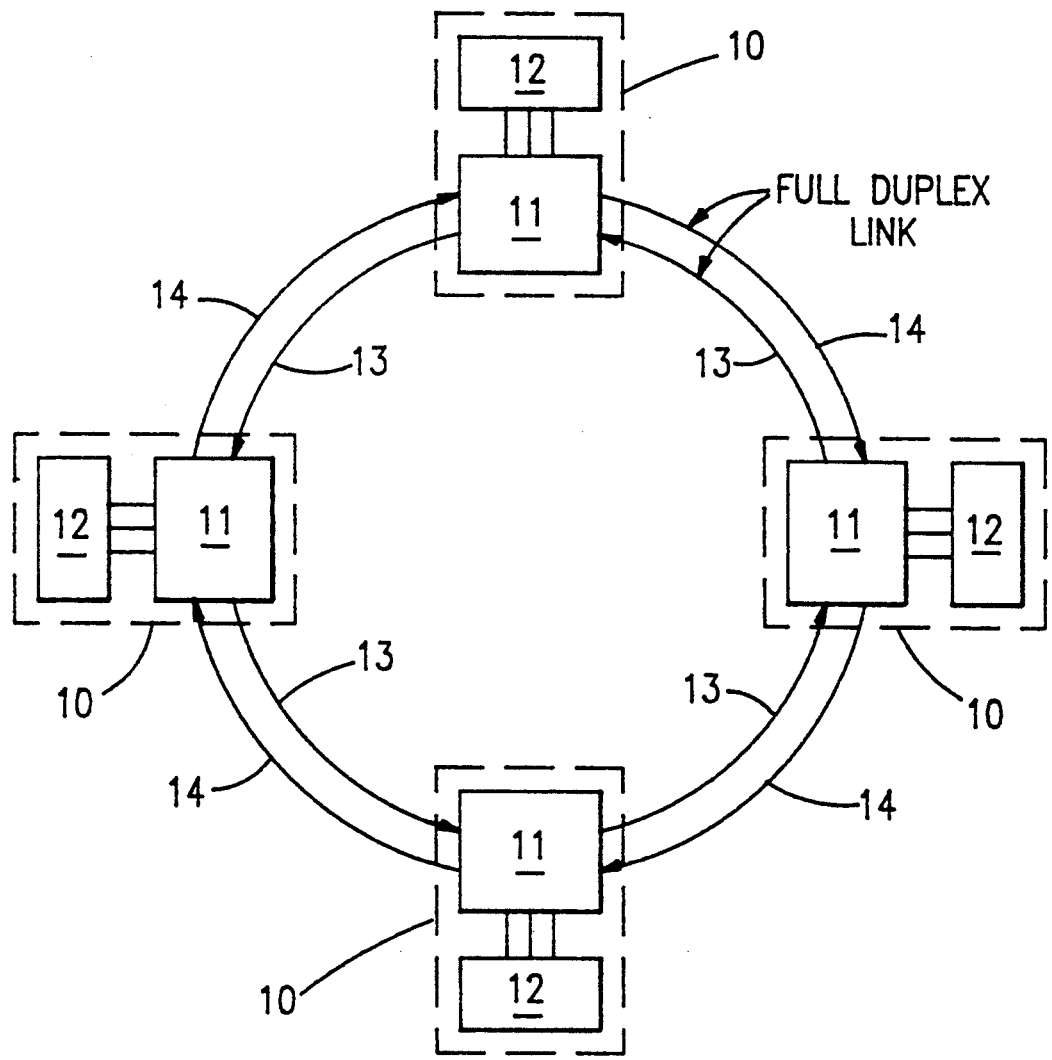
FIG. 1 is a schematic illustration of a full-duplex communications ring used in this invention.
Figure 2:
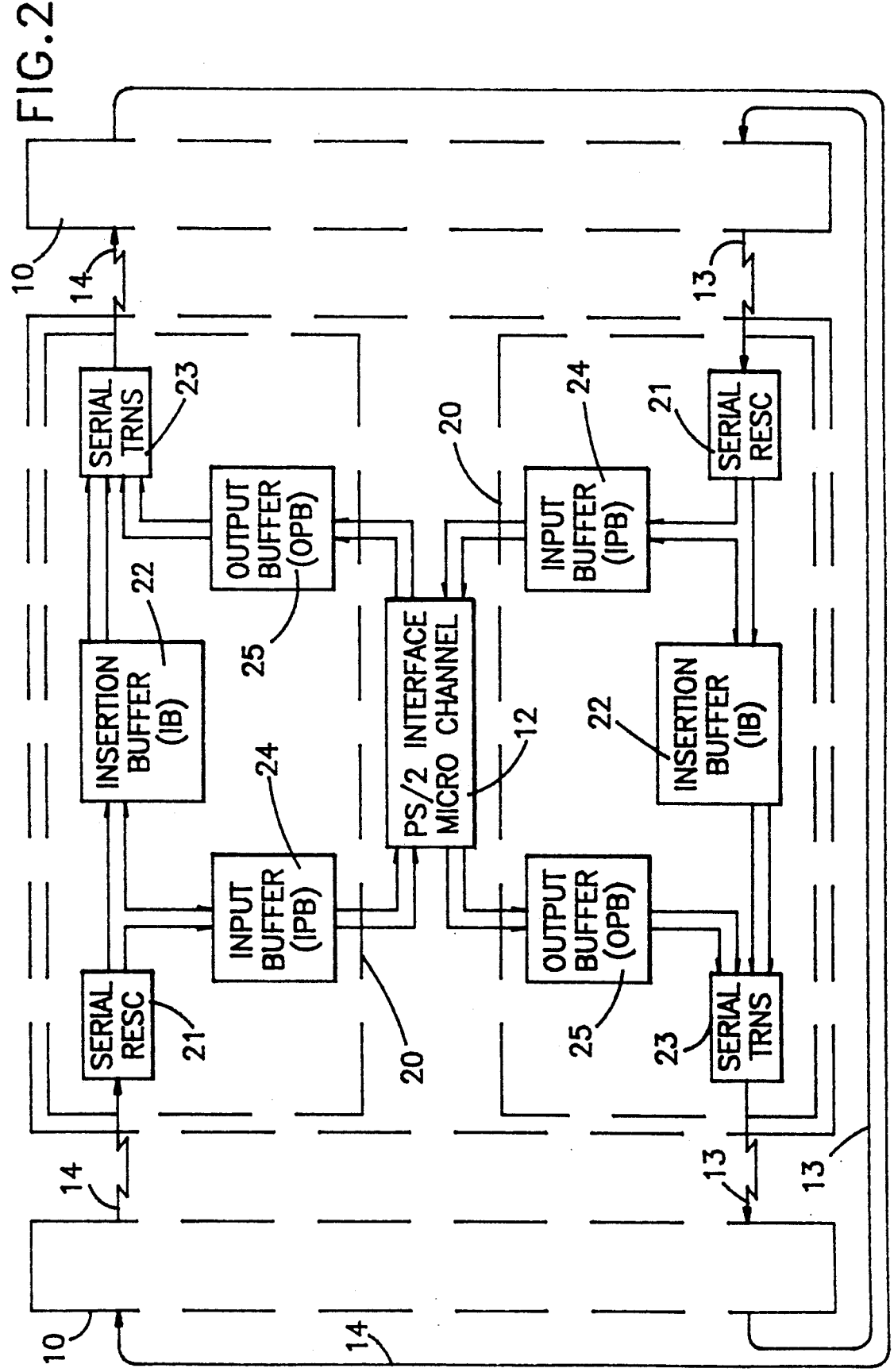
FIG. 2 schematically illustrates the buffer insertion interfaces on a node on the ring.
Figure 12:
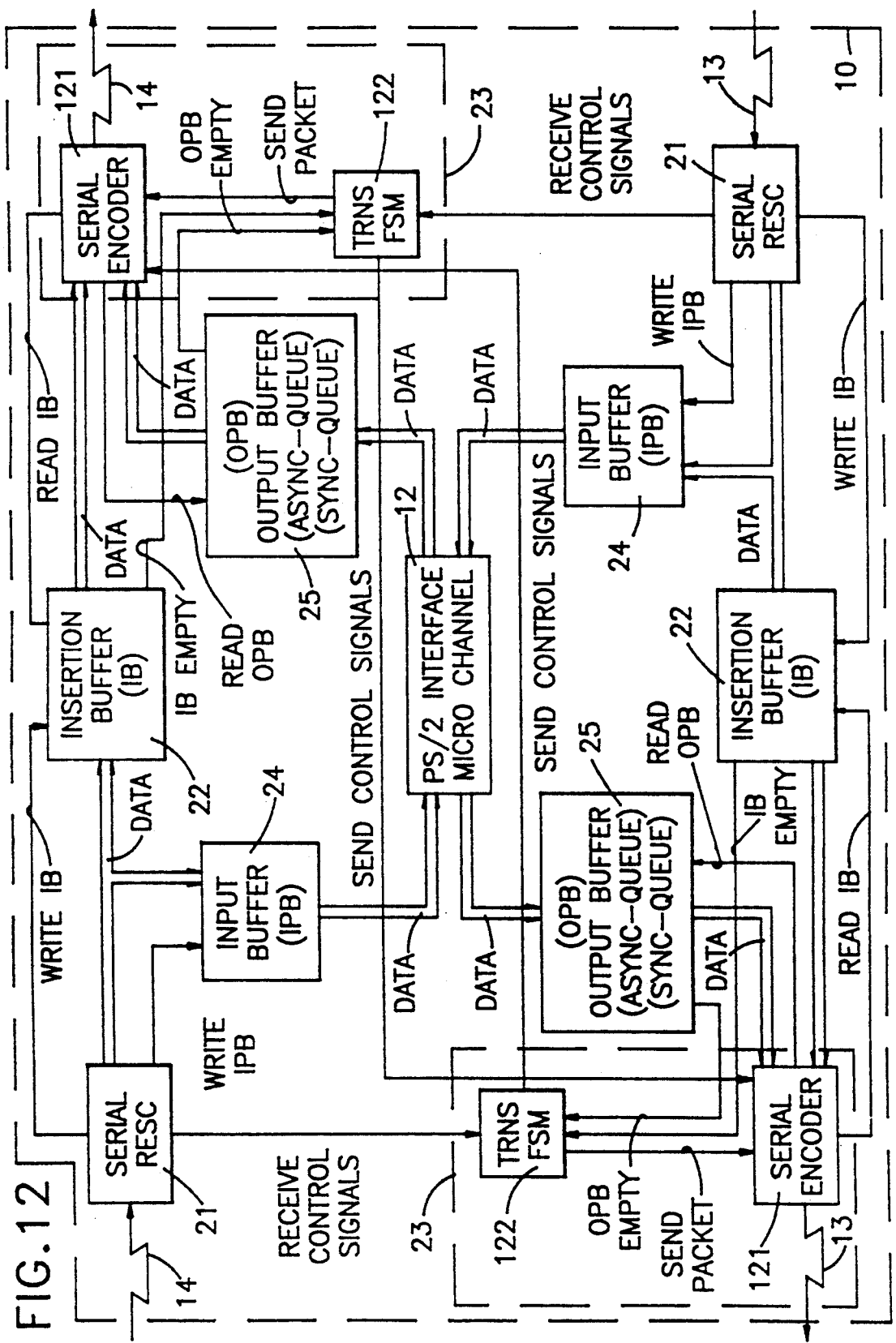
FIG. 12 is a more detailed schematic of a full-duplex interface 11 for a node of this invention.

The full-duplex buffer insertion system has a bidirectional ring topology, which has two unidirectional rings, as shown in FIG. 1. This system has switching entities called nodes (or stations) 10, each containing full-duplex link interface unit 11, and a host interface 12. The full-duplex link interfaces are connected by two unidirectional links 13 and 14. Nodes can send packets to other nodes through the set of links between them. Each pair of links, 13 and 14, that connect two neighboring nodes, can be realized by a single communication medium (e.g., fiber) or by two separate communication mediums (e.g., a pair of coax cables or fibers). The transmission of a packet from source node to a destination node can be done via two possible routes: using the clockwise links 14, or the counter clockwise links 13. The packet is removed from the ring by the destination node. Nodes are named either in an arbitrary fashion or according to a linear ordering. Buffer insertion or register insertion is a distributed medium access technique that can be used in a unidirectional ring. FIG. 2 schematically illustrates two unidirectional buffer insertion interfaces 20. One is connected to the clockwise links 14, and the other interface is connected to the counter clockwise links 13. The two insertions interfaces make up the major portion of the full-duplex interface unit 11 of FIG. 1. Further details of the interface unit 11, along with various control signals, are shown in FIG. 12. On the receiving side of each link there is an insertion buffer (IB) 22, of the size of one maximal size packet. Via the host interface 12, the host reads and writes its packets using input buffer 24 and output buffer 25, respectively. Packet transmission from output buffer 25 can be started via the transmitter 23, only when the insertion buffer 22 is empty. If the ring traffic arrives at receiver 21 when the node is in the middle of a packet transmission, then the ring traffic will be accumulated in the insertion buffer 22 until this packet transmission is completed. The node can no longer transmit unless the insertion buffer 22 becomes idle again, i.e., a non-preemptive priority is given to the ring traffic. If the node is idle, the ring traffic will cut through the insertion buffer 22. This means that a packet does not have to be completely received in the insertion buffer 22 before it starts to be forwarded.

If the received packet is destined to this node the receiver 21 will transfer the packet to the input buffer 24, then the packet is transferred to the host via the host interface 12. When the host has a packet for transmission it will transfer it to the output buffer 25 via the host interface 12.

Buffer insertion medium access control enables the concurrent or simultaneous transmission of packets. The example of FIG. 3 demonstrates the possible concurrent transmission from node 1 to 5, from 6 to 7, from 9 to 12, from 2 to 10 and from 8 to 6 at the same time.

Figure 3:
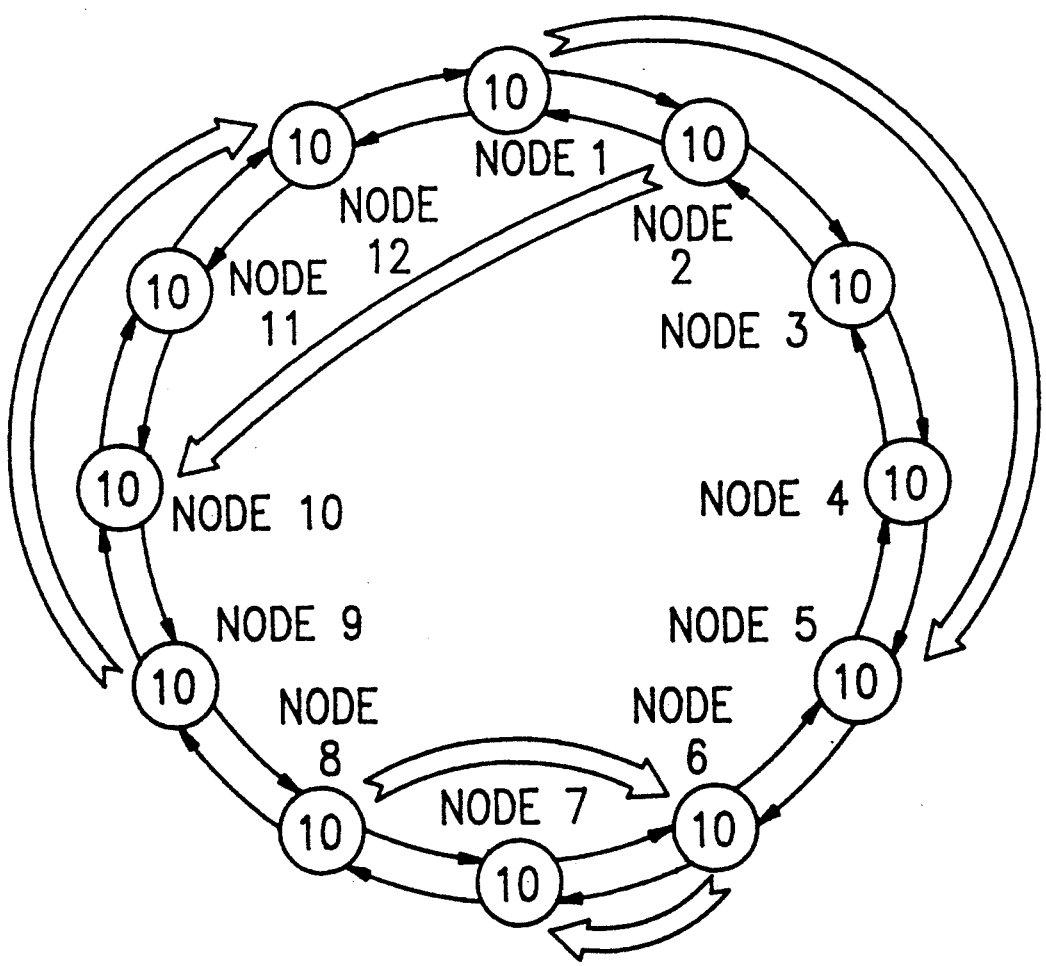
FIG. 3 schematically illustrates concurrent node transmission which could possibly lead to node starvation.

The concurrent transmission over the full-duplex ring does not guarantee a fair access, since an up-stream node can block a down-stream node. Under extreme traffic conditions a node can be unable to transmit for a very long time, i.e., a node can be starved. In FIG. 3 for example, if node 2 will transmit continuously to node 10 and if node 9 will transmit continuously to node 12, then node 11 will not be able to transmit.

Figure 4A:
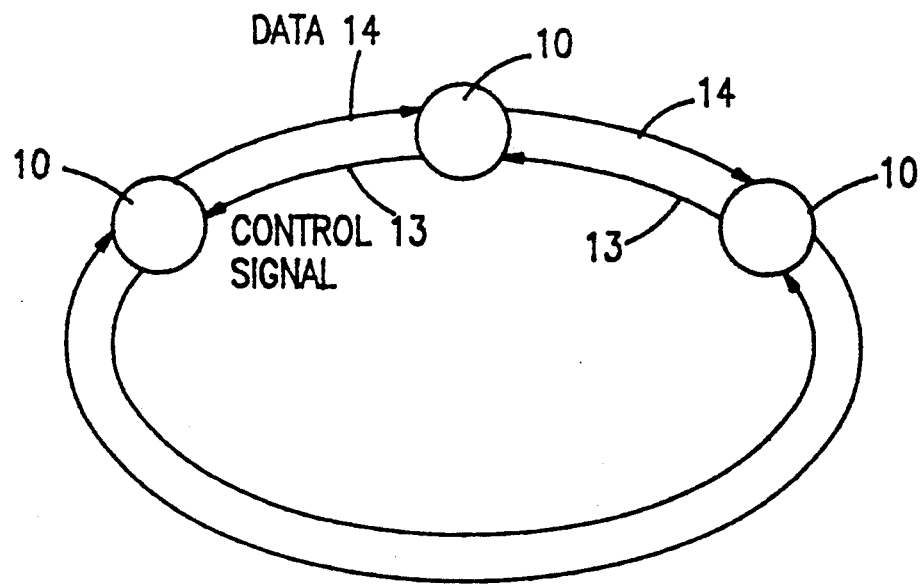
FIGS. 4A and 4B schematically illustrate the transmission of control messages and data in opposite directions on the full-duplex communications ring.
Figure 4B:
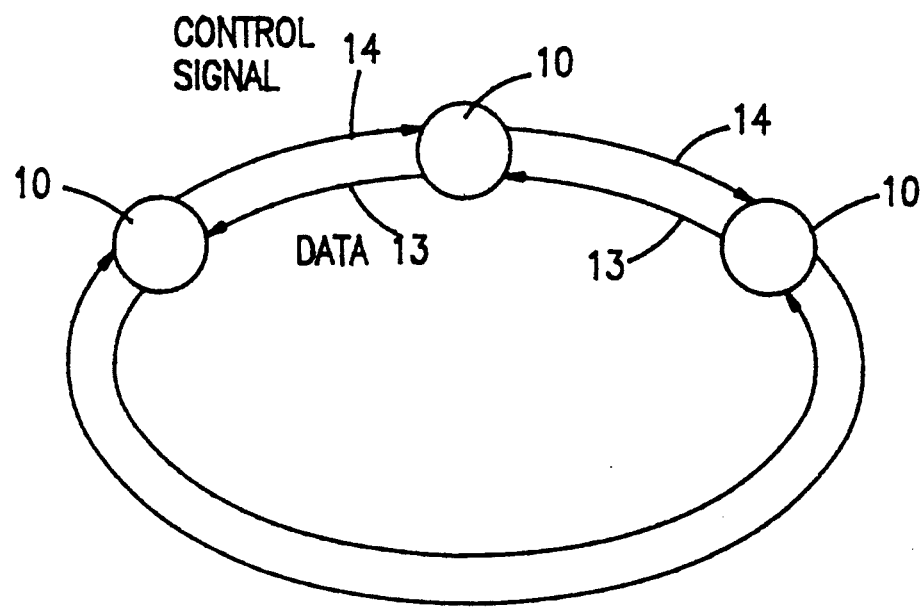

For regulating or balancing the asynchronous data input in each direction of the ring a special control signal, SAT, is used. For the integration of synchronous traffic the ASYNC-EN control signal is used. Each direction of the ring maintains its own SAT and ASYNC-EN signals, which is transferred from one node to its neighbor. In FIG. 4A, the data packets that are transferred in a clockwise direction via links 14, are regulated by SAT and ASYNC-EN control signals which are transferred in the counter clockwise direction via links 13. For regulating the input data traffic in a counter clockwise direction over links 13, the SAT and ASYNC-EN signals, which flow clockwise in a clockwise direction over links 14, are used as shown in FIG. 4B.

The control signals are transferred from one node to its neighbor. A node that receives a signal can forward this message immediately or hold it until some conditions are satisfied. The various scenarios for forwarding or holding the control signals will be described below.

The control signals have the following characteristics:

Very short—few characters (possibly one).
Preemptive priority—can be sent in the middle of a data packet.
Non-distractive—does not damage the data packets which it preempts.

Figure 5A:
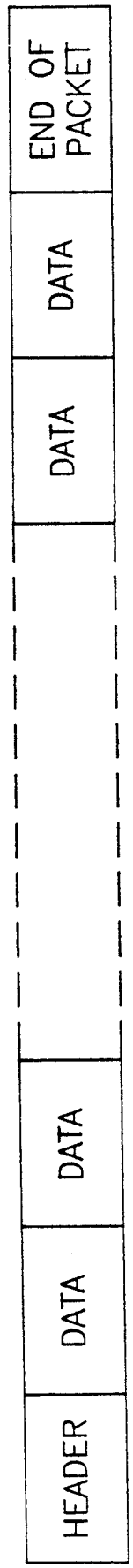
FIG. 5A schematically illustrates a packet.
Figure 5B:
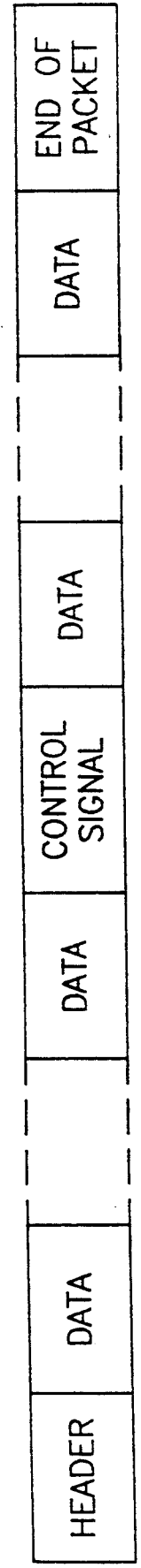
FIG. 5B shows a control signal or message (e.g., SAT or ASYNC-EN) are being transmitted in the middle of a packet.

A packet can be sent over the serial link as a single continuous stream, as shown in FIG. 5A, or can be broken by a control signal, as shown in FIG. 5B.

One way for implementing the transmission of distinct SAT and ASYNC-EN messages is by using one of the unused serial codewords of the 4B/5B code. The 4B/5B encoding scheme is a standard which is used in FDDI. In this scheme every 4 bits of data are transformed into a codeword of 5 bits, as shown in the table in FIG. 6. The unused codewords can be used for transmitting control information from one node to its neighbor. The same also applies to other codes that contain redundant codewords.

Figure 7:
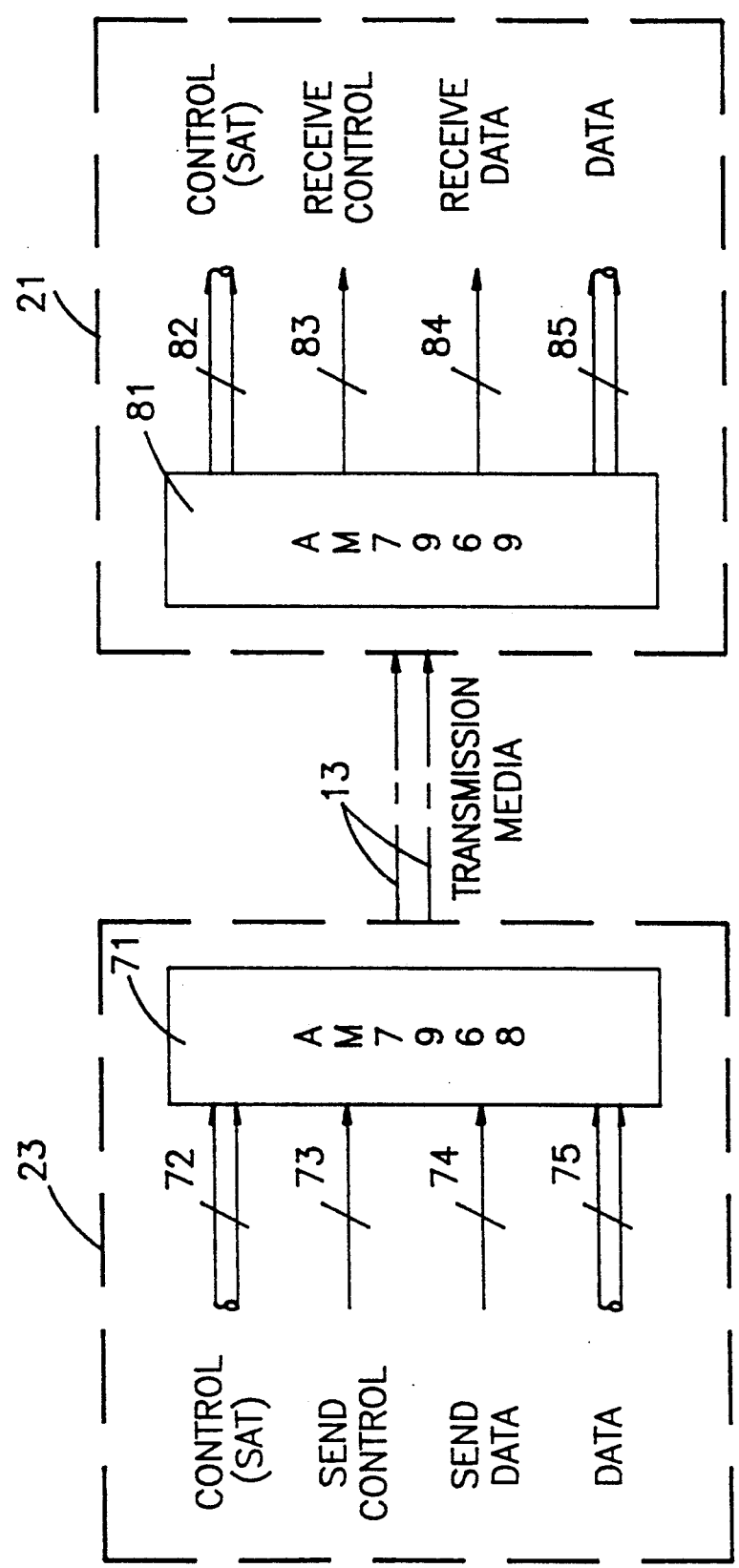
FIG. 7 schematically illustrates the serial communication channel, and the parallel-to-serial and serial-to-parallel converters.

Using the AMD TAXI chip set (transmitter AM 7968 71 and receiver AM 7969 81), it is possible to send distinct control codewords, as shown in FIG. 7. FIG. 7 shows that transmitter AM 7968 is part of the serial transmitter 23, and that receiver AM 7969 is part of the serial receiver 21. When the transmitter receives the SEND CONTROL command 73, a control codeword of 10 bits is sent after the current serial word has been sent. The codeword to be sent is determined by the CONTROL lines 72, and SAT is one of the possible codewords. The list of different control codewords is shown in the table in FIG. 8. The SAT and ASYNC-EN control signals can be selected from the 15 different codewords. For transmitting data the SEND DATA signal 74 is used, and then, 8 bits of data 75 enter the transmitter 71. The codewords (both control and data) are transmitted in a serial form via the transmission media 13 or 14 to the receiver 81. The receiver 81 decodes the incoming serial bit stream. When data is received the 8 bits appear on the data lines 85 with the RECEIVE DATA signal 84. When a control signal is decoded, the control word appears on the control lines 82 with the RECEIVE CONTROL signal 83.

Figure 9:
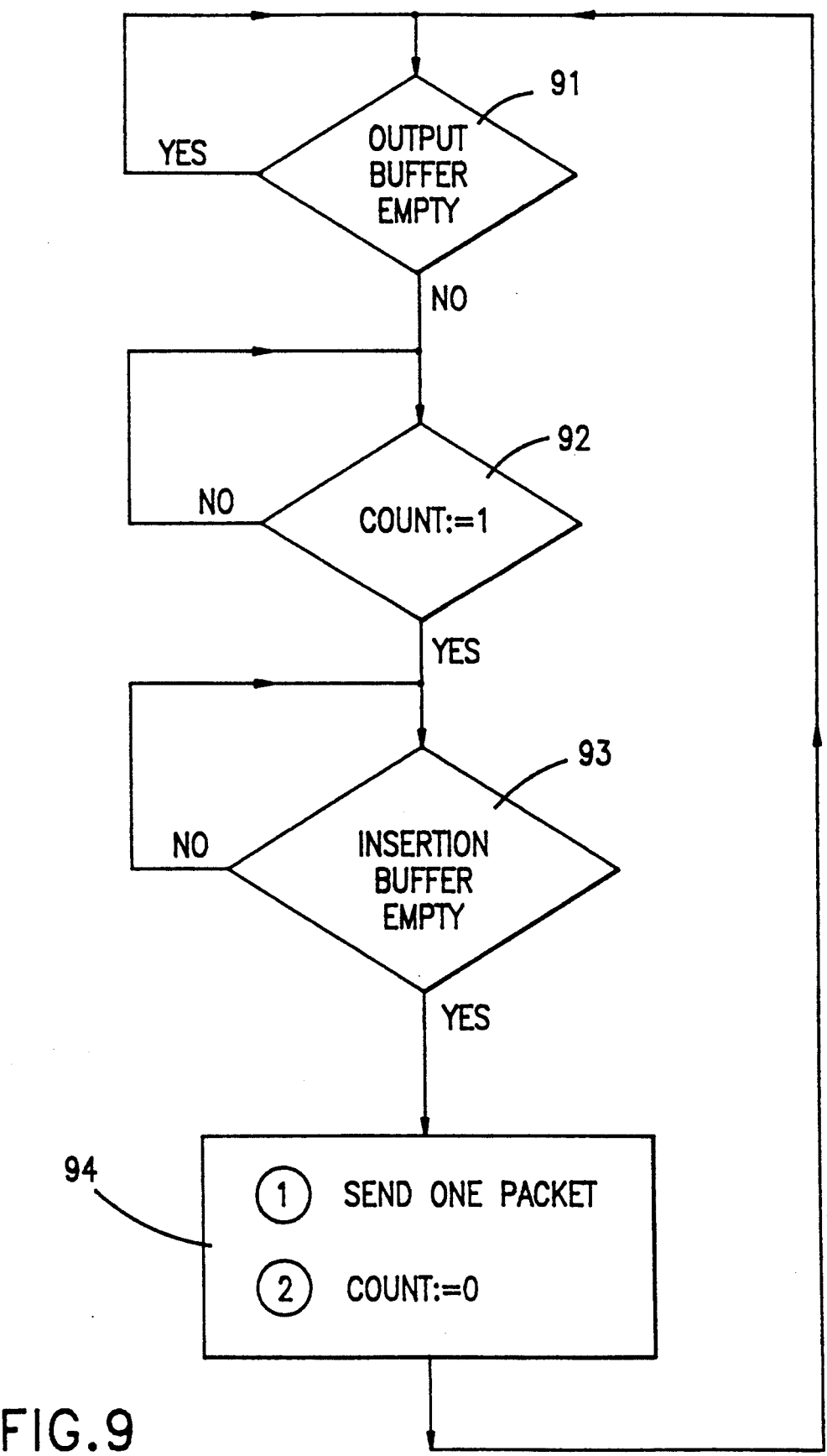
FIG. 9 is a flow chart illustrating how a control signal controls the asynchronous transmission of packets on a communications ring where the first corresponding maximum number of packets that the node is permitted to transmit as 1.

The buffer insertion access control does not enforce fairness on the asynchronous access of nodes to the ring. Moreover, under the buffer insertion access control a node can be starved for unbounded time. Therefore, the asynchronous access to the ring is regulated by the SAT control signal. A node can transmit a packet from its output buffer when it is not empty (91), only if the following two conditions are true (as shown in FIG. 9): (i) the variable COUNT is one (92), and (ii) the insertion buffer is empty (93). After the node transmits the packet, the COUNT variable is set to zero (94).

Figure 10:
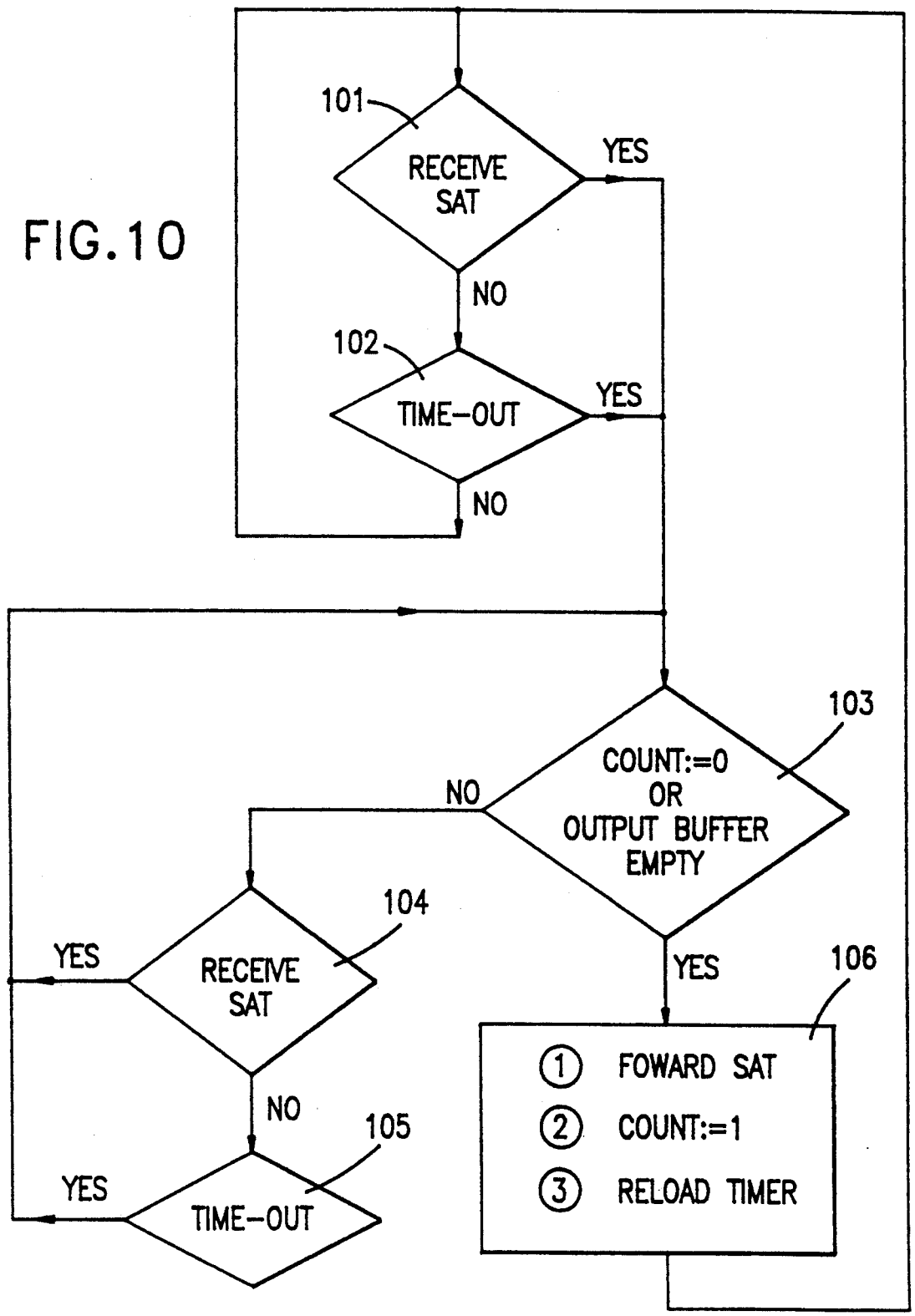
FIG. 10 is a flow chart illustrating how a node reacts to the reception of a control signal, SAT, which regulates the asynchronous transmission into the ring. The node will forward the control signal if the second corresponding number of packets has been transmitted.

FIG. 10 describes what the node does when it receives the SAT message (101). If the SAT message does not arrive after some maximum possible SAT rotation time has passed, time-out will occur (102). The node will react to the time-out as if it has received a SAT message (101). Then, the node will forward the SAT if the variable COUNT is zero (103) or if the output buffer 25 is empty. The node will hold the SAT if the variable COUNT is one (103) and the output buffer 25 is not empty. The node will hold the SAT until COUNT becomes zero (after one packet is transmitted). The node holds the SAT in order to prevent starvation. If during the time the node is holding the SAT another SAT arrives (104), the second SAT will be discarded; and if time-out occurred (105), it will be ignored. After the node forwards the SAT, it will set the COUNT:=1 and reload the timer (106).

This invention integrates two types of traffic over the full-duplex ring: (i) synchronous or real-time traffic that requires connection or reservation set-up, and guarantees for periodic traffic a given bandwidth and bounded delay; and (ii) asynchronous traffic with no real-time constraints that can use the remainder of the bandwidth in a fair manner. The following integration mechanism is functionally equivalent to the TIMED-TOKEN function in FDDI. The main differences are that this integration mechanism does not affect the spatial reuse property of the ring and still maintains round-robin fair access among nodes with asynchronous traffic. (This last property is not guaranteed in FDDI.)

The integration is achieved by the following principles:

1. The synchronous traffic is reserved by some call set-up protocol in software.
2. The output buffer of each node has two queues for synchronous and asynchronous traffic (ASYNC-QUEUE and SYNC-QUEUE). All the reserved traffic is buffered in the synchronous queue.
3. For accessing the ring the synchronous traffic always has priority over the asynchronous traffic.
4. The node can transmit synchronous traffic whenever the ring is idle (insertion buffer empty or empty slot), regardless of its asynchronous traffic state. For example, a node that hold the SAT signal, because it is not satisfied, will first send synchronous traffic and only then send its asynchronous quota and release the SAT.

This last property is very important. It basically says that the synchronous traffic is transmitted even if there are no control signals in the system; i.e., in the case of a ring failure the access of the synchronous traffic will not be stopped. As a result, if the control signal is lost only the asynchronous traffic is stopped during the recovery process.

DISTRIBUTED RESERVATION AND SYNCHRONOUS ACCESS

The distributed reservation is the mechanism which guarantees bandwidth for transferring synchronous traffic over the ring. For the reservation or connection set-up mechanism we assume the following:

1. $T_c$—is the periodic time cycle of synchronous data transfers (in seconds).
2. BW—the data transmission rate (in bits per second).
3. p—the basic data units (in bits). In the slotted mode this is the slot duration in bit periods. The size of each data packet is dp bits, where $d \geq 1$.
4. c—is the number of data units that can be transmitted over each serial link in every time cycle, where $$c = \frac{T_c BW}{p}.$$

5. $\rho$—the maximum fraction of synchronous traffic ($0 \leq \rho < 1$).

When a node tries to reserve bandwidth for real-time transmission, it performs the following protocol:

The set-up protocol performed by a node:
1. Compute how many data units the node needs in one periodical time cycle.

Let l = the number of needed units.

2. Compute the route or the transmission direction. The route determines the reservation path.
3. Send reservation requests for l data units to all nodes along its routing path. This accelerates the reservation part and reduces the probability of conflicts.
4. If affirmative, acknowledgement flows hop by hop from the destination via all the nodes along the reservation path, and this path becomes effective, else the node sends a release request of l data units to all nodes along this reservation path.

Each node maintains a variable RESERVE, which indicates how many data units have been reserved. At all times RESERVE is less than $\rho c$.

When a node receives a reservation request for l data units and if RESERVE+l<$\rho c$, then RESERVE=RESERVE+l and a positive acknowledgement is returned, else RESERVE=RESERVE+l and a negative acknowledgement is returned.

When a node receives a release request for l data units then, RESERVE=RESERVE−l.

After the set-up is completed successfully, the reserved synchronous traffic is transmitted before asynchronous traffic. The reserved synchronous traffic will be queued only if the link is busy. The synchronous traffic is buffered in the SYNC-QUEUE and the asynchronous traffic in the ASYNC-QUEUE.

THE ASYNC-EN INTEGRATION PROTOCOL

The ASYNC-EN (asynchronous enable) control signal is used for enabling and disabling the asynchronous traffic access on each ring interface. (Each direction has a separate identical mechanism.)

Under normal conditions the ASYNC-EN rotates around the ring freely; i.e., each node will forward the ASYNC-EN immediately after receiving it. As a result, the rotation time of this message is about the propagation delay around the ring, $T_{RING}$. We define a parameter $T_{min}$ to be equal to k free rotations of the ASYNC-EN around the ring ($T_{min} = kT_{RING}$). Note that $k \geq 0$, and therefore, $T_{min} \geq 0$, as well.

The ASYNC-EN control signal has three different attributes: GREEN (GR), YELLOW (YL) and RED (RD), as shown in FIG. 11. ASYNC-EN(GR), ASYNC-EN(YL), and ASYNC-EN(RD) can also be considered as three distinct control signals.

Figure 11A:
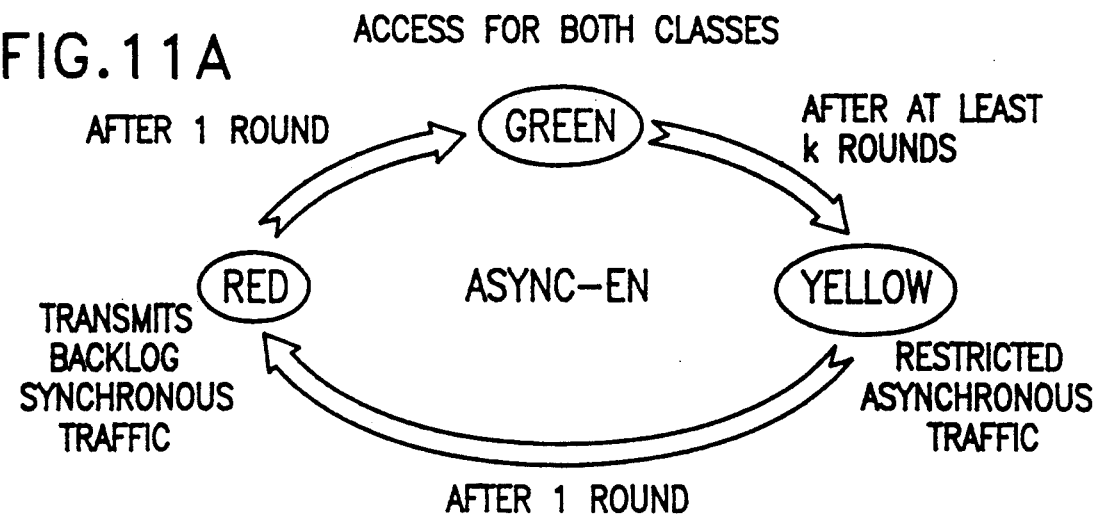
FIG. 11A, 11B and 11C are three state diagrams of the control signal ASYNC-EN with its three different states: GREEN, YELLOW and RED. In each of the three diagrams the conditions which trigger the transition from GREEN to YELLOW is different.
Figure 11B:
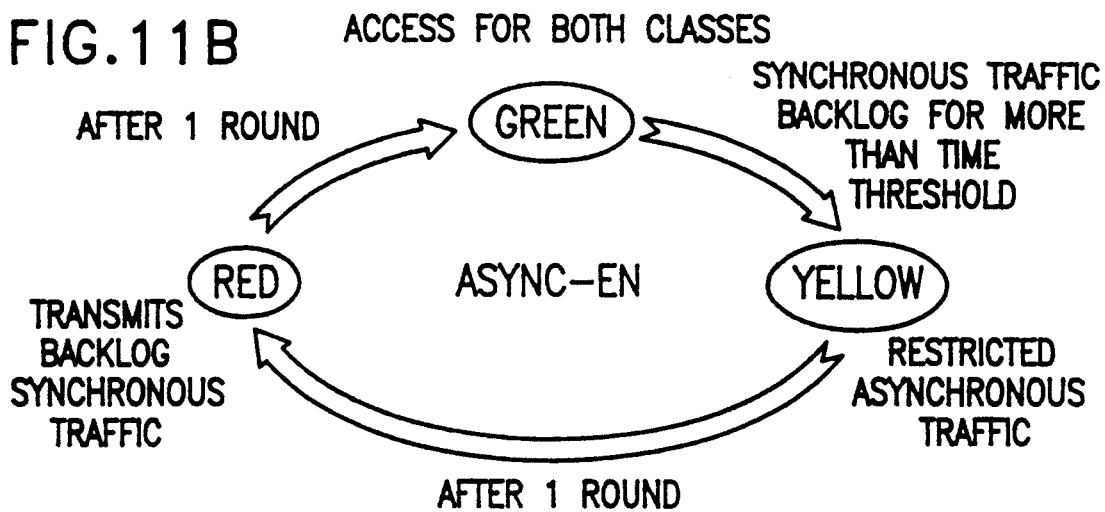
Figure 11C:
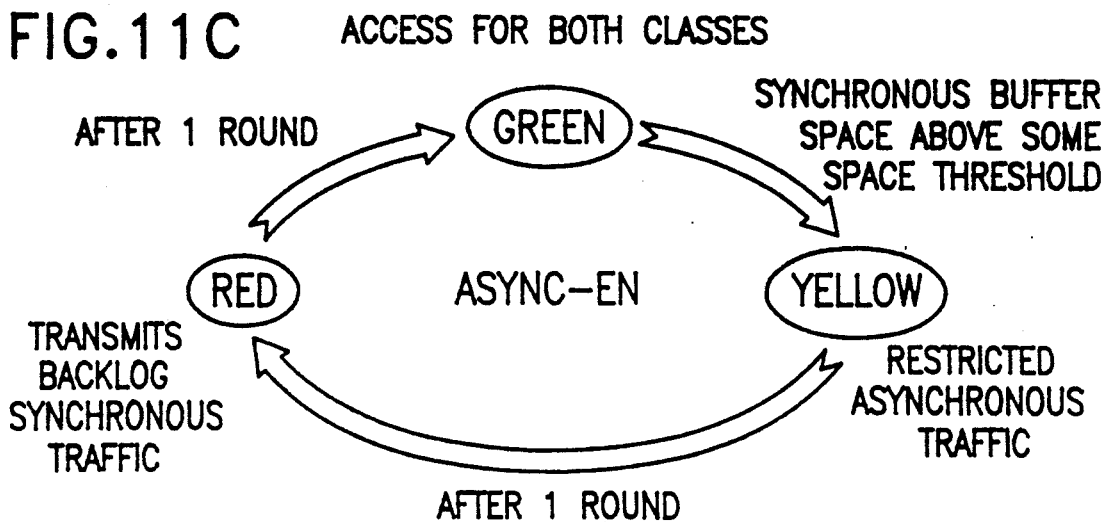

The basic principle of the integration protocol is to halt the asynchronous traffic from time to time, if necessary. There are several possible halting conditions. The first one is the status of the control signal, and the last two are the statuses of nodes with synchronous traffic:

1. The Control Signal, ASYNC-EN, status: after $T_{min}$ has passed and a node has some backlog of synchronous packets to transmit. Note that each node can determine this period by counting k rotations of the ASYNC-EN around the ring, as shown in FIG. 11A.
2. Temporal Local Condition: a synchronous packet in the SYNC-QUEUE on one of the nodes has been backlogged for more than some predefined time threshold, Thres, as shown in FIG. 11B.
3. Spatial Local Buffer Condition: the SYNC-QUEUE is full above some predefined storage space threshold, as shown in FIG. 11C.

ASYNC-EN STATE DEFINITIONS (CONTROL SIGNAL DEFINITIONS)

1. ASYNC-EN(GR) or Green: access for both classes of traffic, synchronous and asynchronous, is enabled. The asynchronous traffic followed the SAT fairness protocol described in U.S. Pat. No. 4,926,418 to incorporated herein by reference. The control signal, ASYNC-EN(GR), rotates freely around the ring until one of the above preconditions becomes true, then a node can change its state to ASYNC-EN(YL). This is a transition of the control signal state or attribute from GREEN to YELLOW. This transition or change can also be treated as the change of a control signal to another control signal.
2. ASYNC-EN(YL) or Yellow: in this state the signal completes one free rotation around the ring. When the nodes see the ASYNC-EN(YL) signal they can not start to transmit new asynchronous packets into the ring.
The YELLOW signal is transmitted unconditionally until it reaches its origin node and then its state is changed to RED. This transition or change can also be treated as the change of a control signal from one control signal to another control signal.
3. ASYNC-EN(RD) or Red: the signal in the RED state is transferred once around the ring.
A node forwards the ASYNC-EN(RD) signal to its up-stream neighbor if its real-time traffic is SATisfied; i.e., all synchronous or real-time traffic in its SYNC-QUEUE has not been in the queue for more than some predefined time threshold (temporal condition).
Another possible SATisfied condition for the synchronous traffic at some node is that its SYNC-QUEUE is not full above some space threshold (spatial condition).
When the RED gets back to its origin node it will change its state back to GREEN (ASYNC-EN(GR)). This transition or change also be treated as the change of a control signal from one control signal to another control signal.

EXAMPLE

Synchronous Integration with Time Threshold

The following is a variation of the above protocol.

Synchronous traffic is considered to be back-logged on some node if it has been waiting in the synchronous transmission queue (SYNC-QUEUE) for more than a predefined time threshold. This time threshold is measured in round trip delays on the ring.

After ASYNC-EN(GR) completes at least k rounds, such that k≧0, and a node has synchronous packets waiting for more than Thres time steps, then this node can change the control signal attribute from ASYNC-EN(GR) to ASYNC-EN(YL). This change could alternatively be expressed as a change from one control signal to another.

When the ASYNC-EN(RD) is received by a node, the node will hold the ASYNC-EN(RD) until all its synchronous data with waiting time of more than Thres time steps are transmitted, then the node will forward ASYNC-EN(RD) signal to its up-stream neighbor node.

Shown in FIG. 12 is a schematic illustration of a full-duplex interface 11 between an IBM PS/2 host and a full-duplex ring. How the node transmits a packet following the buffer insertion protocol was described above in the discussion of FIG. 2. Here, it is shown how the various fairness mechanisms are embedded in the full-duplex interface.

The fairness and integration algorithms are performed by the transmitter finite state machine (TRNS FSM) 122. Each TRNS FSM 122 controls the packet transmission on one direction of the ring. When the TRNS FSM asserts the SEND PACKET signal to the serial transmitter (SERIAL TRNS) 121, then one packet will be sent. The TRNS FSM receives three status lines from the direction it is controlled:

1. IB EMPTY—insertion buffer empty, which indicates the state of the insertion buffer 22.
2. OPB EMPTY—output buffer empty signals, which indicates the status of the output buffer 25, which is constructed of two queues: ASYNC-QUEUE and SYNC-QUEUE.

In addition the TRNS FSM receives several control signals, RECEIVE CONTROL SIGNALS, from the serial receiver (SERIAL RESC) 21, one for the SAT and three for the three types of the ASYNC-EN control signals. Each control signal indicates to the TRNS FSM that either a SAT or ASYNC-EN was received in the opposite direction. If the TRNS FSM is in a satisfied state for the specific control signal, it will assert one of the SEND CONTROL SIGNALS to the SERIAL TRNS 121 in the opposite direction, so SERIAL ENCODER will forward the appropriate control signal up-stream. If the TRNS FSM is not in a satisfied state for this specific control signal, the SERIAL ENCODER 121 will hold this specific control signal until TRNS FSM 122 enters a corresponding satisfied state; and then, TRNS FSM will assert one of the SEND CONTROL SIGNALS to the SERIAL ENCODER 121 in the opposite direction, so it will forward the specific control signal up-stream.

The SEND PACKET signal is asserted if the TRNS FSM is not in a satisfied state and if both the insertion and output buffer are not empty. After a packet is sent, the TRNS FSM checks if it is satisfied or not.

The SERIAL RESC 21 identifies the destination of an incoming packet. If the packet is destined to this node, the packet is written into the INPUT BUFFER (IPB) 24 by using the WRITE IPB signal. If the packet is not destined to this node, the packet is written into the INSERTION BUFFER (IB) 22, by using the WRITE IB signal.

The SERIAL ENCODER 121 can read data from the INSERTION BUFFER 22 by using the READ IB signal, and can read data from the OUTPUT BUFFER 25 by using the READ OPB signal.

Having thus described our invention, what we claim as new and desire to secure by Letters Patents is:

1. A method of controlling the transmission of a first class of traffic that is transmitted with a second class of traffic on a ring network, with said network also having a current protocol, in addition to said method, for controlling the transmission of said first and said second class of traffic on said ring network, said method comprising:

(a) transmitting a first control signal on said ring network, said first control signal indicating that said first and said second class of traffic may be transmitted on said network if said current protocol for said ring network permits;

(b) changing said first control signal to a second control signal if said first control signal reaches a first station of said network having a predetermined backlog of said second class of traffic to be transmitted; and (c) transmitting said second control signal around said network from said first station if said first control signal is changed to said second control signal in step (b), said second control signal indicating to each station receiving it that each station may not transmit said first class of traffic on said ring network.

2. A method as recited in claim 1, wherein said first class of traffic is asynchronous data.

3. A method as recited in claim 1, wherein said second class of traffic is synchronous data.

4. A method as recited in claim 1, wherein said current protocol provides that said first and said second class of traffic will not be transmitted on said ring network from a station of said ring network if either said first class or said second class of traffic is stored in an insertion buffer of said station.

5. A method as recited in claim 1, wherein said predetermined backlog is defined as a condition where a station of said ring network has said second class of traffic, to be transmitted, stored in a designated buffer of latter said station for more than a minimum period of time.

6. A method as recited in claim 1, wherein said predetermined backlog is defined as a condition wherein a station of said ring network has less than a minimum amount of storage space available for storage of additional traffic of said second class of traffic.

7. A method of controlling the transmission of a first class of traffic that is transmitted with a second class of traffic on a ring network, with said network also having a current protocol, in addition to said method, for controlling the transmission of said first and said second class of traffic on said ring network, said method comprising:

(a) transmitting a first control signal on said ring network, said first control signal indicating that said first and said second class of traffic may be transmitted on said network if said current protocol for said ring network permits;

(b) changing said first control signal to a second control signal if, after said first control signal was transmitted at least once around said network, said first control signal reaches a first station of said ring network having a predetermined backlog of said second class of traffic to be transmitted; and (c) transmitting said second control signal around said network from said first station if said first control signal is changed to said second control signal in step (b), said second control signal indicating to each station receiving it that said each station may not transmit said first class of traffic on said ring network.

8. A method of controlling the transmission of a first class of traffic that is transmitted with a second class of traffic on a ring network, with said network also having a current protocol, in addition to said method, for controlling the transmission of said first and said second class of traffic on said ring network, said method comprising:

(a) transmitting a first control signal on said ring network, said first control signal indicating that said first and said second class of traffic may be transmitted on said network if said current protocol for said ring network permits;

(b) changing said first control signal to a second control signal if said first control signal reaches a first station of said ring network having a predetermined backlog of said second class of traffic to be transmitted;

(c) transmitting said second control signal around said network from said first station if said first control signal is changed to said second control signal in step (b), said second control signal indicating to each station receiving it that said each station may not transmit said first class of traffic on said ring network.

(d) changing said second control signal to a third control signal when said second control signal reaches said first station after being transmitted around said ring network as in step (c);

(e) transmitting said third control signal on said ring network from said first station around said ring network with said third control signal being held by each of said stations receiving it until said each station transmits all of its backlog of said second class of traffic;

(f) changing said third control signal to said first control signal when said third control signal reaches said first station after being transmitted around said network as in step (e) and after said first station transmits its backlog, if any, of said second class of traffic; and (g) repeating steps (a) through (f).

9. A method as recited in claim 8, wherein said first class of traffic is asynchronous data.

10. A method as recited in claim 8, wherein said second class of traffic is synchronous data.

11. A method as recited in claim 8, wherein said current protocol provides that said first and said second of class traffic will not be transmitted on said network from a station of said ring network if either said first class or said second class of traffic is stored in an insertion buffer of said station.

12. A method of controlling the transmission of a first class of traffic transmitted with a second class of traffic on a ring network, with said network also having a current protocol, in addition to said method, for controlling the transmission of said first and said second class of traffic on said ring network, said method comprising:

(a) transmitting a first control signal around said ring network, said first control signal indicating that said first and said second class of traffic may be transmitted on said ring network if said current protocols for said ring network permits;

(b) changing said first control signal to a second control signal if, after said first control signal was transmitted at least once around said ring network, said first control signal reaches a first station of said ring network having a predetermined backlog of said second class of traffic to be transmitted;

(c) transmitting said second control signal around said ring network from said first station if said first control signal is changed to said second control signal in step (b), said second control signal indicating to each station receiving it that said each station may not transmit said first class of traffic on said ring network;

(d) changing said second control signal to a third control signal when said second control signal reaches said first station after being transmitted around said ring network as in step (c);

(e) transmitting said third control signal on said ring network from said first station around said ring network with said third control signal being held by each of said stations receiving it until said each station transmits all of its backlog of said second class of traffic;

(f) changing said third control signal to said first control signal when said third control signal reaches said first station after being transmitted around said ring network as in step (c) and after said first station transmits its backlog, if any, of said second class of traffic; and (g) repeating steps (a) through (f).

13. An apparatus for controlling the transmission of a first class of traffic transmitted with a second class of traffic on a ring network, with said network having a current protocol for controlling the transmission of said first and said second class of traffic, which current protocol is in addition to the protocol provided in steps a, b, and c of this claim, said method comprising:

(a) means for transmitting a first control signal on said ring network, said first control signal indicating that said first and said second class of traffic may be transmitted on said ring network if said current protocol for said ring network permits;

(b) means for changing said first control signal to a second control signal if said first control signal reaches a first station of said ring network having a predetermined backlog of said second class of traffic to be transmitted; and (c) means for transmitting said second control signal around said ring network from said first station, with said network having a current protocol for controlling the transmission of said first and said second class of traffic, which current protocol is in addition to the protocol provided in steps a, b, and c of this claim, said second control signal indicating to each station receiving it that said each station may not transmit said first class of traffic on said ring network.

14. An apparatus as recited in claim 13, wherein said first class of traffic is asynchronous data.

15. An apparatus as recited in claim 13, wherein said second class of traffic is synchronous data.

16. An apparatus as recited in claim 13, wherein said current protocol provides that said first and second class of traffic will not be transmitted on said ring network from a station of said ring network if either said first class or said second class of traffic is stored in an insertion buffer of said station.

17. An apparatus as recited in claim 13, wherein backlog is defined as a condition where a station of said ring network has said second class of traffic on, to be transmitted, stored in a designated buffer of latter said station for more than a minimum period of time.

18. An apparatus as recited in claim 13, wherein said predetermined backlog is defined as a condition wherein a station of said network has less than a minimum amount of storage space available for storage of additional traffic of said second class of traffic.

19. An apparatus for controlling the transmission of a first class of traffic that is transmitted with a second class of traffic on a ring network, with said network having a current protocol for controlling the transmission of said first and said second class of traffic, which current protocol is in addition to the protocol provided in steps a, b, and c of this claim, said method comprising:
   (a) means for transmitting a first control signal around said ring network, said first control signal indicating that said first and said second class of traffic may be transmitted on said ring network if said current protocol for said ring network permits;
   (b) means for changing said first control signal to a second control signal if said first control signal reaches a first station of said network having a predetermined backlog of said second class of traffic to be transmitted; and
   (c) means for transmitting said second control signal around said ring network from said first station if said first control signal is changed to said second control signal in step (b), said second control signal indicating to each station receiving it that said each station may not transmit said first class of traffic on said ring network.

20. An apparatus for controlling the transmission of a first class of traffic transmitted with a second class of traffic on a ring network, with said network having a current protocol for controlling the transmission of said first and said second class of traffic, which current protocol is in addition to the protocol provided in steps a, b, and c of this claim, said method comprising:
   (a) means for transmitting a first control signal around said network, said first control signal indicating that said first and said second class of traffic may be transmitted on said network if said current on protocol for said ring network permits;
   (b) means for changing said first control signal to a second control signal if said first control signal reaches a first station of said ring network having a predetermined backlog of said second class of traffic to be transmitted; and
   (c) means for transmitting said second control signal around said ring network from said first station if said first control signal is changed to said second control signal in step (b), said second control signal indicating to each station receiving it that said each station may not transmit said first class of traffic on said ring network;
   (d) means for changing said second control signal to a third control signal when said second control signal reaches said first station after being transmitted around said ring network as in step (c);
   (e) means for transmitting said third control signal on said ring network from said first station around said ring network with said third control signal being held by each of said stations receiving it until said each station transmits all of its backlog of said second class of traffic;
   (f) means for changing said third control signal to said first control signal when said third control signal reaches said first station after being transmitted around said ring network as in step (e) and after said first station transmits its backlog, if any, of said second class of traffic; and
   (g) means for repeating steps (a) through (f).

* * * * *